HORIZONTAL SWEEP CIRCUIT

Filed Feb. 7, 1957

INVENTOR.
Lowell S. Kongable,
BY
Mueller & Aichele
Att'ys.

2,886,741

HORIZONTAL SWEEP CIRCUIT

Lowell S. Kongable, Prospect Heights, Ill., assignor to Motorola, Inc., a corporation of Illinois Application February 7, 1957, Serial No. 638,725

9 Claims. (Cl. 315—27)

Figures 1, 2, 3, 4:
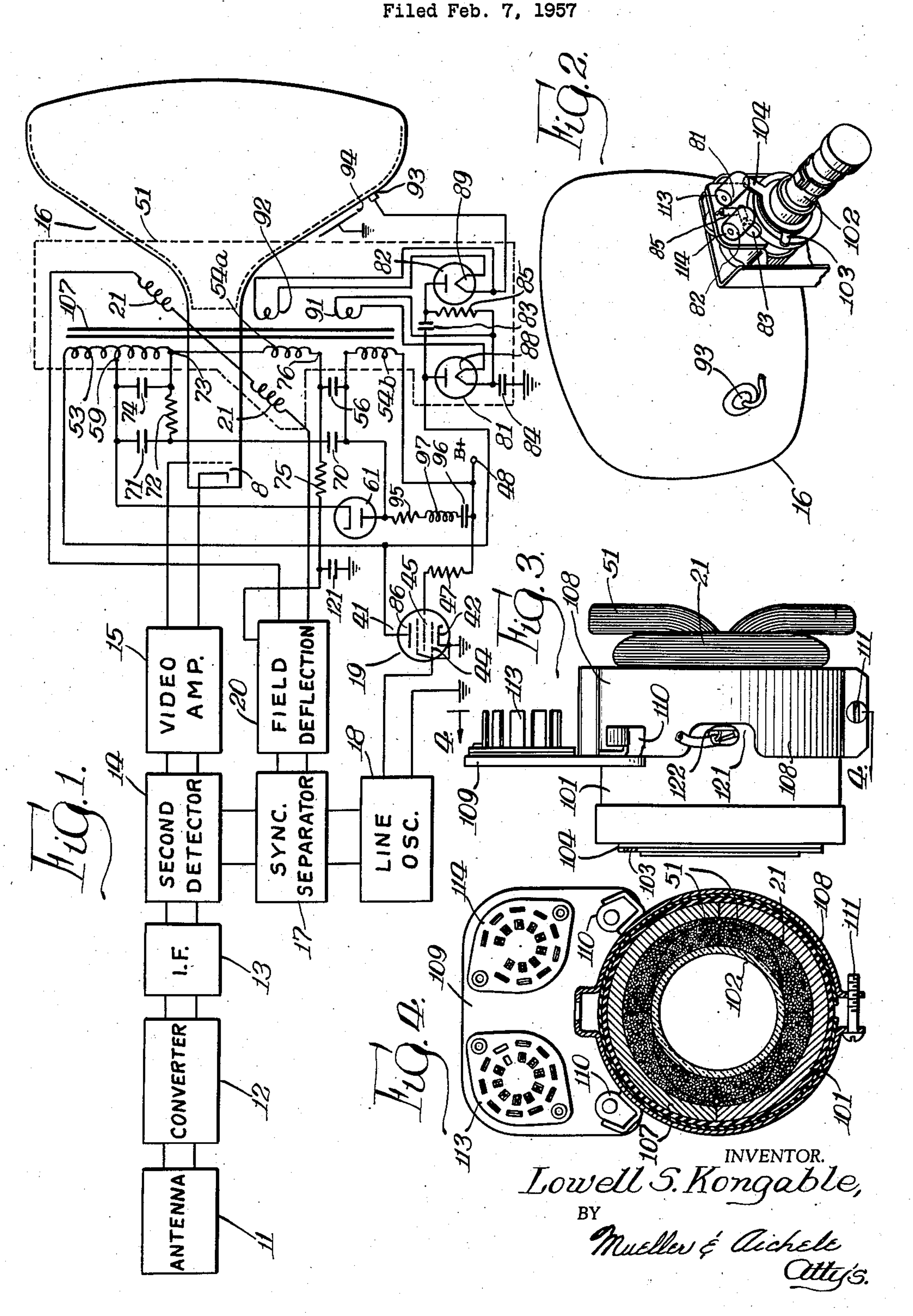

The present invention relates to television receivers, and more particularly to an improved system for deflecting the cathode-ray beam of the image reproducer of a television receiver and for providing a high-voltage accelerating potential for the beam thereof.

In the present day television receivers, the line or horizontal deflection system for the image reproducer constitutes one of the most complicated and costly portions of the receiver. This system includes synchronizing and automatic frequency control stages, an oscillator stage, and a power amplifier output stage coupled through a transformer to the line deflection yoke of the reproducer. A suitable damping circuit may be coupled across the transformer to suppress ringing signals and generally improve the operating characteristics of the deflection system.

In the early development of the television art, considerable losses were experienced in the line deflection system energy dissipated in the transformer and damping circuit. This condition was obviated to some extent by the use of "bootstrap" circuits which utilized the energy normally dissipated in the system to effect a boost in the operating voltage supplied to the power amplifier output stage. In these systems it was considered essential to use an output transformer to step up the voltage to obtain high voltage and to step up the currents to provide the proper magnitude for deflection. The transformer also facilitated the release of stored energy into the unidirectional potential supply circuit of the power amplifier. Such a transformer, of course, represented additional costs in circuit construction as well as the introduction of inherent losses due to leakage and shunt inductances, coil and core losses.

Direct drive bootstrap deflection systems have been devised in which the anode of the power output stage is directly coupled to the deflection yoke, and which do not require an output transformer. However, the prior art direct drive arrangements for the deflection yoke in television receivers have been complicated, and have not been able to eliminate completely the ringing effects of high frequency components in the system. Also, there is a problem in producing the high voltage for the beam-accelerating anode of the reproducer.

It is, accordingly, an object of the present invention to provide a television receiver having an improved horizontal deflection system of the direct drive type in which the inadequacies of the prior art arrangements are successfully overcome.

Another object of the invention is to provide such a deflection system in which the ringing effects are eliminated.

A further object of the invention is to provide a direct drive deflection system which provides high voltage and which utilizes a yoke having a minimum number of windings.

A feature of the invention is the provision of a television receiver having a direct drive horizontal deflection system for the image reproducer, in which the deflection yoke of the reproducer is included directly in the anode circuit of the power amplifier stage of the deflection system, and in which a voltage-doubler circuit is driven directly by the yoke so that a high-voltage unidirectional beam-accelerating potential may be provided therefrom without disturbing the normal operation of the yoke and with a minimum number of windings provided in the yoke.

Another feature of the invention is the provision of a yoke structure for the image reproducer of a television receiver which includes voltage-doubler tubes for providing high voltage mounted compactly upon the yoke.

A further feature of the invention is the provision of a directly driven bootstrap-type deflection system having a yoke with a winding portion thereof in the damping circuit and a series resonant network in shunt with a winding portion to eliminate ringing. A pair of series capacitors and a resistor also may be provided across the bootstrap portion of the yoke to capacitively balance the halves of that portion and eliminate ringing therefrom.

In the drawings:

Fig. 1 shows a television receiver incorporating the improved deflection system of the present invention; and Figs. 2–4 show various views of an improved yoke for the image reproducer of the receiver of Fig. 1, constructed in accordance with the invention.

The invention is applicable to a television receiver of the type using an electromagnetically deflected cathode ray image reproducer, and comprises a horizontal deflection yoke winding for producing a magnetic field in the reproducer, and a sweep system for supplying a periodic deflection signal to the deflection winding and including an output stage directly coupled to the winding. The invention also comprises a voltage multiplier connected to the yoke for supplying high voltage to the second anode of the reproducer. Plate voltage is supplied to the output stage through a damping tube for the yoke from a B+ supply. A portion of the yoke is connected between the B+ supply and the damping tube, and to eliminate ringing effects, a damped series-resonant network is connected in parallel with that portion of the yoke. The input of the voltage-multiplier circuit is connected directly to the plate of the output stage so that the voltage-multiplier circuit also is driven by the yoke. The yoke has a bootstrap capacitor supplying it with voltage and the damping tube is tapped into the yoke so that the yoke acts as an auto-transformer. A pair of series capacitors are connected across a portion of the yoke and the bootstrap capacitor, with the junction of the pair of capacitors connected by a resistor to the midpoint of that portion of the yoke to eliminate ringing therein.

The yoke also includes a pair of vertical deflection windings. A mounting panel having sockets therein for tubes of the voltage-multiplier circuit is supported on the yoke. The panel also mounts capacitors and resistors of the voltage-multiplier circuit thereon.

The television receiver of Fig. 1 includes an antenna 11 coupled through a converter 12 to an intermediate frequency amplifier 13 of any desired number of stages. The output terminals of intermediate frequency amplifier 13 are coupled through a second detector 14 to a video amplifier 15. The output terminals of video amplifier 15 are connected to the input electrodes 8 of a cathode-ray tube image reproducer 16.

Second detector 14 is coupled to a synchronizing signal separator 17 having output terminals connected to a horizontal or line sweep oscillator 18, and the sweep oscillator is coupled to the line deflection winding sections 53, **54*a* and 54*b* of reproducer 16 through an output amplifier stage 19. Separator 17 has further output terminals connected to a field deflection system 20 which, in turn, has output terminals connected to the vertical or field deflection winding 21 associated with reproducer 16**.

A television signal intercepted by antenna 11 is heterodyned to the selected intermediate frequency of the receiver in converter 12. The resulting intermediate-frequency signal is amplified in amplifier 13 and detected in second detector 14 so as to produce a composite video signal. The composite video signal is amplified in video amplifier 15 and applied to the input electrodes 8 of reproducer 16 to control the intensity of the cathode ray beam therein in accordance with the image intelligence.

The synchronizing components of the television signal are separated from the composite video signal by separator 17, the line synchronizing components being utilized to synchronize the line sweep oscillator 18 and the field synchronizing components being utilized to synchronize field deflection system 20. In this manner, the deflection of the cathode-ray beam in reproducer 16 is synchronized with the received television signal so that the reproducer is able to synthesize the image represented thereby. The sound portion of the television receiver forms no part of the present invention and, for that reason, has not been shown.

As previously stated, the present invention is particularly concerned with the output stage 19 of the line deflection systems, and this stage will be described in detail. The output terminals of line sweep oscillator system 18 are connected to ground and to the control electrode 44 of a vacuum tube 41. Tube 41 is connected to constitute the power amplifier output stag of the line deflection system, and has a cathode 42 directly connected to ground, and a screen electrode 45 connected through a resistor 47 to the B+ terminal 48 of a source of unidirectional potential. Tube 41 has a plate 86 directly connected to the outer end of section 53 of the line deflection winding or horizontal yoke 51.

Sections 53 and **54*a* of the line deflection winding have their inner ends coupled together and the outer end of section 54*b* is connected to the B+ terminal. A damping diode 61 has a cathode connected to a tap 59 on winding section 53 and has an anode connected to junction of the wniding section 54*b* and bootstrap capacitor 56, the diode being shunted by capacitors 70 and 71 of equal capacitance. A resistor 72 is connected from the junction of the capacitors 70 and 71 to a point 73 which is the junction of the inner ends of the windings 53 and 54*a*. A capacitor 74 is connected between the taps 59 and 73. A resistor 75 connected at end 76 of the deflection yoke winding 54*a* applies the bootstrap voltage to the field deflection system 20**.

The connections are made to the horizontal winding sections 53, **54*a*, and 54*b* in a manner such that the yoke coil distribution is essentially unchanged for the output tube and damper tube currents for satisfactory linearity, low deflection defocussing, and high efficiency. Moreover, the taps 59 and 76 are selected at equal points on the yoke sections so that a balanced condition is maintained and the same amount of current flows through both yoke sections. This balanced condition causes the yoke sections to produce bucking fields with no residual flux circulating around the core with attendant losses and adverse effects on the high voltage developed by the yoke. A damped series-resonant circuit shunting the section 54*b* includes a resistor 95, a capacitor 96 and an inductor 97**.

A voltage-doubler circuit provides high voltage for the cathode-ray tube and includes diodes 81 and 82, capacitors 83 and 84 and a resistor 85. The voltage across the yoke 51 is applied to the voltage doubler circuit. Filament-cathodes 88 and 89 of the diodes 81 and 82 are supplied with heating current by secondary windings 91 and 92 which may comprise two turns wound around the core 107. The high output voltage of the voltage-doubler circuit is applied to the second, or beam-accelerating, anode 93 of the tube 16. The usual aquadag capacitor 94 also is provided.

The physical structure of the horizontal and vertical yokes is shown in Figs. 2–4, and includes an annular structure 101 about the mutually insulated yoke windings 21 and 51 on the neck 102 of the tube 16. The structure 101 includes core 107 and an insulating sleeve thereabout. A clamping strap 108 supports brackets 110 which mount a panel 109 of electrical insulation. The ends of strap 108 are secured together by a bolt 111 to tighten the strap on the yoke and fix the strap against movement. Tube sockets 113 and 114 are mounted on the panel, and receive and support the diodes 81 and 82. Notches 121 in the strap 108 are provided for leads 122 from secondary windings 91 and 92. Known adjusting mechanisms 103 and 104 are provided for centering the beam.

The operation of the circuit is as follows:

The horizontal oscillator generates a sawtooth voltage which is applied to the grid 44. This causes tube 41 to conduct a current which changes linearly with time. When the grid signal cuts off conduction of tube 41, the energy stored in yoke 51 flows into the circuit capacity causing a high positive peak voltage at the plate of tube 41. This voltage is rectified and doubled by tubes 81 and 82, and is applied to the second anode of the tube 16 to provide sufficient brightness for viewing a trace on it. The flow of energy into the circuit capacity and back into the inductance of yoke 51 is in the form of a half sine wave of oscillation. As the voltage at the plate of tube 41 tries to oscillate to a negative polarity, the voltage at the point at which the cathode of damper tube 61 is connected to yoke 51 becomes sufficiently close to the plate voltage so that tube 61 begins to conduct. This prevents any further negative excursion of the voltage and damps the oscillations so that the change of current flow in yoke 51 varies linearly and at the same rate with respect to time as it does when tube 41 is conducting. The return energy through tube 61 is stored in capacitor 56, adding the voltage thereof to B+ to produce the "bootstrap" voltage which is the plate supply for tube 41. After damper tube 61 finishes conducting, tube 41 starts conducting and the cycle repeats itself.

Tube 61 is connected across equal portions of each coil so that symmetrical flux will produce a rectangular raster and avoids unsymmetrical flux which will produce a trapezoidal raster. The taps are placed to give the most efficient operation with linear sweep. This requires that the ratio of the damper turns to the total turns be about the same as the ratio of the recovered reactive power to the reactive input power.

Capacitors 70, 71, and 74 and resistor 72 comprise a network to prevent oscillation of circulating currents across the coils shunted by the damper tube. The series resonant circuit formed by inductor 97 and capacitor 96 damp the oscillations in the lower yoke winding 54 not shunted by the damper tube. This network is series-resonant so that the damping required is small and it consumes very little energy. Resistor 75 and capacitor 121 are a filter to remove radio frequency from the bootstrap supply so that higher than B+ voltage may be used in another circuit if desired. Windings 91 and 92 are two turns around the yoke core to supply energy for heating the high voltage rectifier filaments. Capacitor 56 need not be placed at the tap 76 but can be any place between the damper taps. The physical size of the deflection yoke can be minimized because the energy stored and lost in the transformer in conventional circuits is now used to help scan the cathode ray tube. Also, ringing is eliminated.

The system described above has been constructed and has been found to operate with a high degree of efficiency. In a constructed embodiment of the invention, the following operating voltages, constants and structural details were used, and these are given merely by way of example and are not intended to limit the invention in any way.

| | |
|---|---|
| Resistor 72 | 5.6 kilohms. |
| Resistor 95 | 820 ohms. |

| | |
|---|---|
| Resistor 85 | 2 megohms. |
| Resistor 75 | 330 kilohms. |
| Winding sections 53, 54a plus 54b | 48 millihenries. |
| Inductor 97 | 300 microhenries. |
| Capacitor 74 | 100 mmf. |
| Capacitor 70 | 210 mmf. |
| Capacitor 71 | 210 mmf. |
| Capacitor 56 | 0.1 mf. |
| Capacitor 96 | 390 mmf. |
| Capacitor 83 | 470 mmf. |
| Capacitor 84 | 470 mmf. |
| Capacitor 121 | 0.01 mf. |
| Diode 61 | 19 AU4. |
| Diodes 81 and 82 | 1V2. |
| Tube 19 | 12DQ6. |
| Winding section 53 | 380 turns of No. 30 wire. |
| Winding section 54b plus 54a | 380 turns of No. 30 wire. |
| Tap 59 | Tapped down 55 turns from upper end of winding section 53. |
| 54b | 55 turns. |
| B+ | 138 volts. |
| Bootstrap voltage | 470 volts. |
| Filtered bootstrap voltage | 315 volts. |
| HV @ 100 ma | 8.4 kilovolts. |
| HV @ 200 ma | 7.7 kilovolts. |
| Plate voltage tube 19 | 4.85 kilovolts. |
| Cathode current tube 19 | 140 ma. |
| Screen grid current tube 19 | 16.5 ma. |
| Plate current tube 19 | 123.5 ma. |

The above described circuit minimizes ringing, has a minimum number of windings and may be simply produced.

With the deflection system described above, the need for an output transformer is dispensed with, and the power amplifier 19 is directly coupled to the line deflection winding sections 53, 54a, and 54b. Moreover, the deflection system is connected to develop a suitable bootstrap voltage for the amplifier. High voltage for the accelerating electrode of the reproducer is developed by the provision of the voltage-doubler directly on the yoke, and any ringing currents produced by the high-voltage windings are suppressed by means of the described circuitry.

I claim:

1. In a line deflection system for a cathode-ray tube reproducer of a television receiver, the combination of a line deflection winding, an amplifier tube having an anode connected to one end of said winding for providing a current wave therein, a damping diode connected across a portion of the winding, a network including a pair of equal capacitors in series with one another and in parallel with said damping diode and also including a resistor connecting the junction of said capacitors to the midpoint of said portion of said winding, positive voltage supply means supplying voltage to the other end of said winding, and a series resonant circuit connecting said voltage supply means to said diode.

2. In a line deflection system for a cathode-ray tube reproducer of a television receiver, and which cathode-ray tube reproducer requires an accelerating potential, the combination of a line deflection winding having a plurality of sections, an amplifier tube connected to one end of said winding, a bootstrap capacitor connected between a pair of adjacent winding sections, a damping diode connected across a portion of the winding and across said bootstrap capacitor, positive voltage supply means supplying voltage to the other end of said winding, a series resonant circuit connecting said voltage supply means to said diode and bridging a portion of said winding not bridged by said diode, and a voltage-multiplier circuit supplied with voltage directly from said winding for providing the accelerating potential for said reproducer.

3. In a line deflection system for a cathode-ray tube reproducer of a television receiver, the combination of a line deflection winding, a line deflection amplifier tube supplied with plate voltage from one end of said winding, a damping diode connected across a portion of the winding intermediate the ends thereof, a network including a pair of equal capacitors connected in series with one another and in parallel with said damping diode, a resistor connecting the junction of the capacitors with one another to the midpoint of said portion of said winding, positive voltage supply means supplying voltage to the other end of said winding, a series-resonant circuit connecting said voltage supply means to said diode, a voltage-multiplier circuit supplied with voltage connected directly to said one end of said winding, and a bootstrap capacitor means in said winding.

4. In a line deflection system for a cathode-ray tube reproducer of a television receiver, and which cathode-ray tube reproducer includes a second anode requiring a high voltage, the combination of a line deflection winding, a line deflection amplifier tube supplied with plate voltage from one end of said winding, a damping diode connected across a portion of said winding, a network for damping ringing currents in said portion of said winding, a bootstrap capacitor connected between portions of said winding, positive voltage supply means supplying voltage to the other end of said winding, a series-resonant circuit connected in shunt with the portion of said winding between said diode and said other end of said winding and connecting said voltage supply means to said diode, and a voltage-doubler circuit supplied with voltage directly from said winding for supplying high voltage to the second anode of the cathode-ray tube reproducer.

5. In a television receiver, the combination of a cathode-ray tube requiring a high voltage for operation and having a neck, a magnetic core mounted on said neck, a deflection winding carried by said core, a mounting panel mounted on said core, and a system for providing high voltage for operation of the cathode-ray tube reproducer, said system including a plurality of diodes connected in a voltage doubler circuit coupled to said winding, said diodes being mounted on said panel to facilitate the coupling of said circuit to said winding.

6. In a television receiver, the combination of a cathode-ray tube having a neck, a yoke core mounted on said neck, a horizontal sweep coil carried by said core, a panel having a pair of sockets, a clamping strap having brackets supporting said panel and mounted in gripping engagement with said core, a pair of tubes seated in said sockets and supported thereby, filament supply windings coupled to said coil and connected to the filaments of said tubes, means forming with said tubes a voltage-doubler circuit, means supplying power to said voltage-doubler circuit, and means connecting the output of said voltage-doubler circuit to the second anode of said cathode-ray tube.

7. In a television receiver of the type utilizing an electromagnetically deflected cathode-ray image reproducer, the combination of a deflection yoke winding for producing a magnetic field in the reproducer and comprising a pair of series-connected yoke sections, bootstrap capacitor means interposed in series circuit with said yoke sections intermediate the outer ends of the series combination of said sections, damping means including a unilaterally conductive device connected from a tap on one of said yoke sections to a tap on the other of said yoke sections and embracing said bootstrap capacitor means, a positive voltage line connected to one end of said winding, a sweep system for supplying a periodic deflection signal to said deflection yoke winding and including an output stage directly coupled to the other end of said winding, and voltage-multiplying means coupled across said yoke sections for developing a unidirectional potential for the cathode-ray image reproducer.

8. In a television receiver of the type utilizing an electromagnetically deflected cathode-ray image reproducer, the combination of a deflection yoke winding for producing a magnetic field in the reproducer and comprising a pair of series-connected yoke sections, bootstrap capacitor means interposed in series circuit with said yoke sections intermediate the outer ends of the series combination of said sections, damping means including a unilaterally conductive device connected from a tap on one of said yoke sections to a tap on the other of said yoke sections and embracing said bootstrap capacitor means, a power source including a positive line connected to one end of said winding, a series-resonant circuit connected in shunt with the portion of said winding between said damping means and said one end of said winding for suppressing ringing, a sweep system for supplying a periodic deflection signal to said deflection yoke winding and including an output stage directly coupled to the other end of said winding, and rectifying means coupled across said yoke sections for developing a unidirectional potential for the cathode ray image reproducer.

9. In a television receiver of the type utilizing an electromagnetically deflected cathode-ray image reproducer, the combination of a deflection yoke winding for producing a magnetic field in the image reproducer and comprising first and second series-connected yoke sections, bootstrap capacitor means interposed in series circuit with said yoke sections, damping means including a unilaterally conductive device connected from a first intermediate tap on said first yoke section to a second intermediate tap on said second yoke section and embracing said bootstrap capacitor means, said first intermediate tap being situated a selected number of turns of said first yoke section from the extremity thereof and said second intermediate tap being in a position corresponding to the same number of turns of said second yoke section from the extremity thereof, a sweep system for supplying a periodic deflection signal to said deflection yoke winding and including an output stage directly connected to said extremity of said first yoke section, power supply means connected to said extremity of said second yoke section, a series-resonant circuit connecting said power supply means to said unilaterally conductive device, a pair of series-connected capacitors connected across said unilaterally conductive device and connected at the juncture of the capacitors to said windings at a point the same number of turns from each of said taps, and rectifying means coupled across said yoke sections for developing a unidirectional potential for the cathode-ray image reproducer, said rectifying means including first and second rectifying elements connected in a voltage-doubler circuit.

References Cited in the file of this patent

UNITED STATES PATENTS

| | | |
|---|---|---|
| 2,566,432 | Sziklai | Sept. 4, 1951 |
| 2,655,615 | Seldin | Oct. 13, 1953 |
| 2,677,784 | Jacobson | May 4, 1954 |
| 2,781,475 | Fyler | Feb. 12, 1957 |
| 2,796,552 | Dietch | June 18, 1957 |